United States Patent
Likwornik

(10) Patent No.: US 7,711,106 B2
(45) Date of Patent: May 4, 2010

(54) TELEPHONE BASED METHOD AND SYSTEM FOR ADDING CONTACTS TO A PERSONAL NETWORK ADDRESS BOOK

(75) Inventor: Zeev Likwornik, Moshav Herut (IL)

(73) Assignee: Comverse, Ltd., Tel Aviv (IL)

( * ) Notice: Subject to any disclaimer, the term of this patent is extended or adjusted under 35 U.S.C. 154(b) by 1856 days.

(21) Appl. No.: 10/608,534

(22) Filed: Jun. 30, 2003

(65) Prior Publication Data

US 2004/0266414 A1 Dec. 30, 2004

(51) Int. Cl.
*H04M 15/00* (2006.01)
*H04M 1/00* (2006.01)
*H04M 3/00* (2006.01)

(52) U.S. Cl. .................................. 379/355.04; 379/126

(58) Field of Classification Search ............ 379/114.01, 379/121.01, 122, 126, 127.01, 127.06, 355.01, 379/355.02, 355.03, 355.04; 455/418, 550.1, 455/565

See application file for complete search history.

(56) References Cited

U.S. PATENT DOCUMENTS

| | | | |
|---|---|---|---|
| 6,757,360 B1 * | 6/2004 | Tolopka ..................... 379/67.1 |
| 6,766,017 B1 * | 7/2004 | Yang ....................... 379/355.02 |
| 6,952,805 B1 * | 10/2005 | Tafoya et al. ................ 715/739 |
| 7,035,393 B1 * | 4/2006 | Silver et al. ............. 379/355.03 |
| 7,110,529 B2 * | 9/2006 | Kang ..................... 379/355.02 |
| 2002/0143879 A1 * | 10/2002 | Sommerer ................... 709/206 |
| 2003/0076934 A1 * | 4/2003 | Albal et al. ............... 379/88.19 |
| 2003/0078981 A1 * | 4/2003 | Harms et al. ................ 709/206 |
| 2003/0185365 A1 * | 10/2003 | Mansfield .............. 379/142.01 |
| 2004/0186848 A1 * | 9/2004 | Kobashikawa et al. ...... 707/102 |
| 2004/0203579 A1 * | 10/2004 | Comp ......................... 455/406 |
| 2007/0281673 A1 * | 12/2007 | Comp ......................... 455/415 |

* cited by examiner

*Primary Examiner*—Binh K Tieu
(74) *Attorney, Agent, or Firm*—Ohlandt, Greeley, Ruggiero & Perle, L.L.P.

(57) ABSTRACT

A system and method for adding contact information to a personal network address book is provided. Contact information is added to the address book by analyzing a billing database or call detail record in order to determine telephone numbers which meet predetermined criteria set by a user. Telephone numbers meeting the predetermined criteria are extracted and transferred to the user. The user is prompted for a nickname corresponding to each extracted telephone number. The nickname and the corresponding telephone number are then stored in the personal network address book. In a voice activated dialing system, the user is able to speak the nickname in order to initiate the dialing process.

41 Claims, 2 Drawing Sheets

TELEPHONE BASED METHOD AND SYSTEM FOR ADDING CONTACTS TO A PERSONAL NETWORK ADDRESS BOOK

BACKGROUND OF THE INVENTION

1. Field of the Invention

The present invention relates a personal network address book. More particularly, the present invention relates to a telephone based system and method for adding contacts to a personal network address book.

2. Related Art

In the past, people tended to maintain the same contact information for years. In today's world, however, people's contact information tends to change regularly. Trying to keep pace with the changing contact information of friends and associates can prove to be a daunting task.

In recent years, personal network address books have become popular tools for allowing people to keep track of information about their contacts. In conventional network address book applications, when a user receives new contact information, the user must manually enter the contact information into the personal network address book application.

Alternatively, a user may synchronize contact information between another device (e.g., handset or PDA) and the personal network address book. Again, however, the user is forced to manually enter the contact information into the other device (e.g., handset or PDA) before synchronizing with the personal network address book.

A problem associated with such systems is that it is very time consuming for users to personally enter all of the contact information. Furthermore, it has proven difficult for users to identify precisely which contacts should be added to their personal network address book, which contacts are so seldom used that they do not need to be added, and which contacts need to be removed.

Therefore, what is needed is an efficient way to populate and maintain a user's personal network address book with the most relevant and up to date contact information available.

SUMMARY OF THE INVENTION

A system and method for adding contact information to a personal network address book is provided. Contact information is added to the address book by analyzing a billing database or call detail record in order to determine telephone numbers which meet predetermined criteria. The predetermined criteria may be set by the system operator or by a user of the system. In an illustrative embodiment, predetermined criteria set by the user overrides predetermined criteria set by the system operator.

In an illustrative embodiment, telephone numbers meeting the predetermined criteria are extracted and transferred to the user. The user is then prompted for a nickname corresponding to each extracted telephone number. The nicknames supplied by the user and the associated telephones number are stored in the personal network address book. In a voice activated dialing system, the user is able to speak the nickname to thereby initiate the dialing process.

In an illustrative embodiment, the system utilizes a telephone directory to obtain full names corresponding to the extracted telephone numbers. The full names are then transferred to the user, whereby the user is prompted for a nickname corresponding to each full name. The nicknames supplied by the user along with the associated telephone numbers are stored in the personal network address book. In a voice activated dialing system, the user is able to speak the nickname to thereby initiate the dialing process.

The above and other features of the invention including various and novel details of construction and combination of parts will now be more fully described with reference to the accompanying drawings and pointed out in the claims. It will be understood that the particular features embodying the invention are shown by way of illustration only and not as a limitation of the invention. The principles and features of this invention may be employed in varied and numerous embodiments without departing from the scope of the invention.

BRIEF DESCRIPTION OF THE DRAWINGS

Aspects of illustrative, non-limiting embodiments of the present invention will become more apparent by describing in detail embodiments thereof with reference to the attached drawings in which.

DETAILED DESCRIPTION OF THE INVENTION

The following description of illustrative non-limiting embodiments of the invention discloses specific configurations, features, and operations. However, the embodiments are merely examples of the present invention, and thus, the specific features described below are merely used to more easily describe such embodiments and to provide an overall understanding of the present invention.

Accordingly, one skilled in the art will readily recognize that the present invention is not limited to the specific embodiments described below. Furthermore, the description of various configurations, features, and operations of the present invention that are known to one skilled in the art are omitted for the sake of clarity and brevity. Also, it is to be understood that the phraseology and terminology employed herein is for the purpose of description and should not be regarded as limiting.

Figure 1:
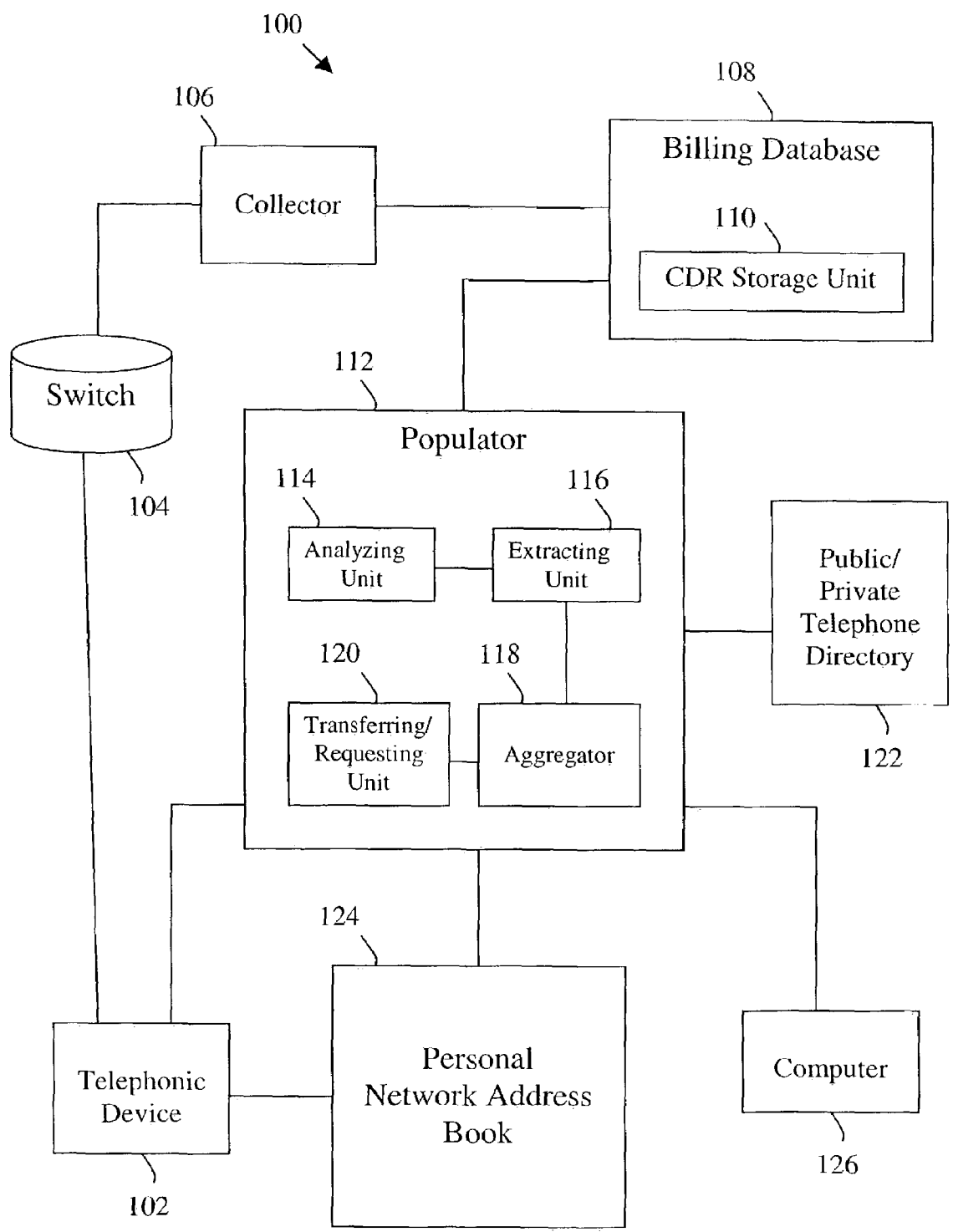
FIG. 1 is a block diagram of a telephone based system for adding contacts to a personal network address book according to an illustrative embodiment of the present invention.

Reference is made to FIG. 1, which is a block diagram depicting a telephone based system 100 for adding contacts to a personal network address book 124 according to an illustrative embodiment of the present invention. By utilizing an address book which is stored on a network, users are able to access the address book from multiple telephonic devices or computers without needing to program every device.

In illustrative embodiments, a telephonic device may comprise a mobile telephone, a conventional wireline telephone, a personal digital assistant, and other forms of communication devices able to initiate calls. A computer may comprise any non-telephonic device that can provision and manage personal network address book 124.

As shown in FIG. 1, the system 100 includes a telephonic device 102 which is able to connect to a switch 104. The switch 104 contains information relating to a telephone call made or received by the user. A collector 106 gathers data from switch 104 and builds a call detail record (CDR). The CDR contains the originating telephone number, the terminating telephone number, the start time of the telephone call, the end time of the telephone call, the duration of the telephone call, as well as other information.

The CDR is typically stored until an invoice is ready to be produced by the telephone service system. In conventional telephone service systems, invoices are prepared approximately once per month. When it is time to prepare the invoice, the CDR is retrieved by a billing database 108 and stored in a CDR storage unit 110. The CDR is then examined in order to calculate charges that a particular user has accrued during a certain time period.

In an illustrative embodiment of the present invention, a populator 112 is provided which contains an analyzing unit 114, an extracting unit 116, an aggregator 118, and a transferring/requesting unit 120. In an illustrative embodiment, populator 112 is a software package which is provided as a separate logical entity in system 100. In other illustrative embodiments, populator 112 may reside in billing database 108 or personal network address book 124.

Analyzing unit 114 provided in populator 112 is responsible for analyzing a CDR stored within billing database 108 to determine whether any stored telephone numbers meet predetermined criteria. Extracting unit 116 is responsible for extracting any telephone numbers which meet the predetermined criteria.

The predetermined criteria that defines which telephone numbers will be extracted can be set by a system operator or can be customized by a user of the system. Predetermined criteria set by the user will override any conflicting predetermined criteria set by the system operator. The predetermined criteria can be based upon any combination of all relevant attributes in the CDR (e.g., telephone number, time of call, duration of call, etc.) or any information that can be concluded from a combination of the CDRs (e.g., a number of times a certain telephone number was called).

An example of criteria which can be defined by a user includes the number of times a particular telephone number was dialed by the user within a certain time period. For example, a user may instruct telephone numbers to be extracted which the user dialed more than a certain number of times in the preceding month.

Another example of criteria defined by the user includes the number of times that telephone calls from a particular telephone number were received by the user within a certain time period. For example, a user may instruct telephone numbers to be extracted which telephoned the user more than a certain number of times in the preceding month.

A user may also set criteria such that telephone numbers are extracted for telephone calls which exceeded a predefined duration. For example, a user may instruct all telephone numbers to be extracted for telephone calls which lasted over ten minutes in duration.

Conversely, a user may set criteria such that all telephone calls under a predetermined duration may be discarded for purposes of extraction. For example, the user may set criteria such that all telephone numbers associated with telephone calls lasting less than ten seconds in duration are ignored.

As another example, a threshold may be set by the user which relates to deleting stale entries from the personal network address book 124. For example, the user may instruct all telephone numbers in the personal network address book 124 which have not been dialed within a certain number of months to be removed from the personal network address book 124. By removing stale entries, personal network address book 124 is able to maintain only relevant contacts which the user actively utilizes.

In an illustrative embodiment, the entries which are removed are stored in a "trash" folder within the personal network address book 124 for a predetermined amount of time. If it is determined that the deleted telephone number should be added to the personal network address book 124 again, within the predetermined amount of time, the telephone number can easily be retrieved from the "trash" folder.

The foregoing examples of user defined criteria are recited as illustrative examples only and are not intended to be limiting. The user is able to customize the criteria based on personal preferences and may employ any combination of criteria which adequately meets the user's needs.

Furthermore, the extracting unit 116 included within populator 112 is configured such that telephone numbers which have been extracted from billing database 108 and are currently included within the user's personal network address book 124 are not extracted again from billing database 108. This prevents unnecessary duplication of contact information within personal network address book 124, thereby preventing wasted data storage space.

As discussed above, populator 112 is able to analyze and extract telephone numbers which meet predetermined criteria. After the telephone numbers are extracted, aggregator 118 builds a list of the extracted telephone numbers. If a telephone directory is available, aggregator 118 connects to a public or private telephone directory 122 via a directory connection layer to lookup a "full" name associated with each extracted telephone number. In addition, a street address associated with each extracted telephone number can also be retrieved from public or private telephone directory 122 and stored for inclusion within personal network address book 124. An illustrative example of a private telephone directory includes a corporate telephone directory.

After receiving the associated "full" names and street addresses from the telephone directory 122, aggregator 118 sends the list of telephone numbers and associated "full" names and street addresses to transferring/requesting unit 120. If a telephone directory is not available, aggregator 118 sends only the list of extracted telephone numbers to transferring/requesting unit 120.

Transferring/requesting unit 120 provided within populator 112 is able to transfer data to a user's telephonic device 102 or to the user's computer 126. Examples of data which can be transferred to the user's telephonic device 102 or computer 126 include the telephone numbers extracted by extracting unit 116, the names obtained from the public or private telephone directory 122 which are associated with the extracted telephone numbers, or a combination of the two.

As discussed above, telephonic device 102 may comprise a mobile telephone, a conventional wireline telephone, a personal digital assistant, and other forms of communication devices able to initiate calls. In an illustrative embodiment, the user's telephonic device 102 or a service providing unit within the telephone network, to which the telephonic device is connected, is capable of voice activated dialing. Capable of being utilized from any mobile telephonic device or conventional wireline telephone, voice activated dialing presents a simplified manner for users to initiate telephone calls.

Along with the data transferred to the user's telephonic device 102 or computer 126, the transferring/requesting unit 120 requests the user to supply a nickname corresponding to the transferred telephone numbers and/or names extracted from the public or private telephone directory 122. After the user supplies the nicknames, transferring/requesting unit 120 transfers the nicknames, full names, and street addresses to personal network address book 124 which stores this information with the corresponding telephone numbers extracted by extracting unit 116. Storing telephone numbers with associated nicknames allows the user to speak the nicknames when initiating a telephone call in a voice activated dialing mode.

Figure 2:
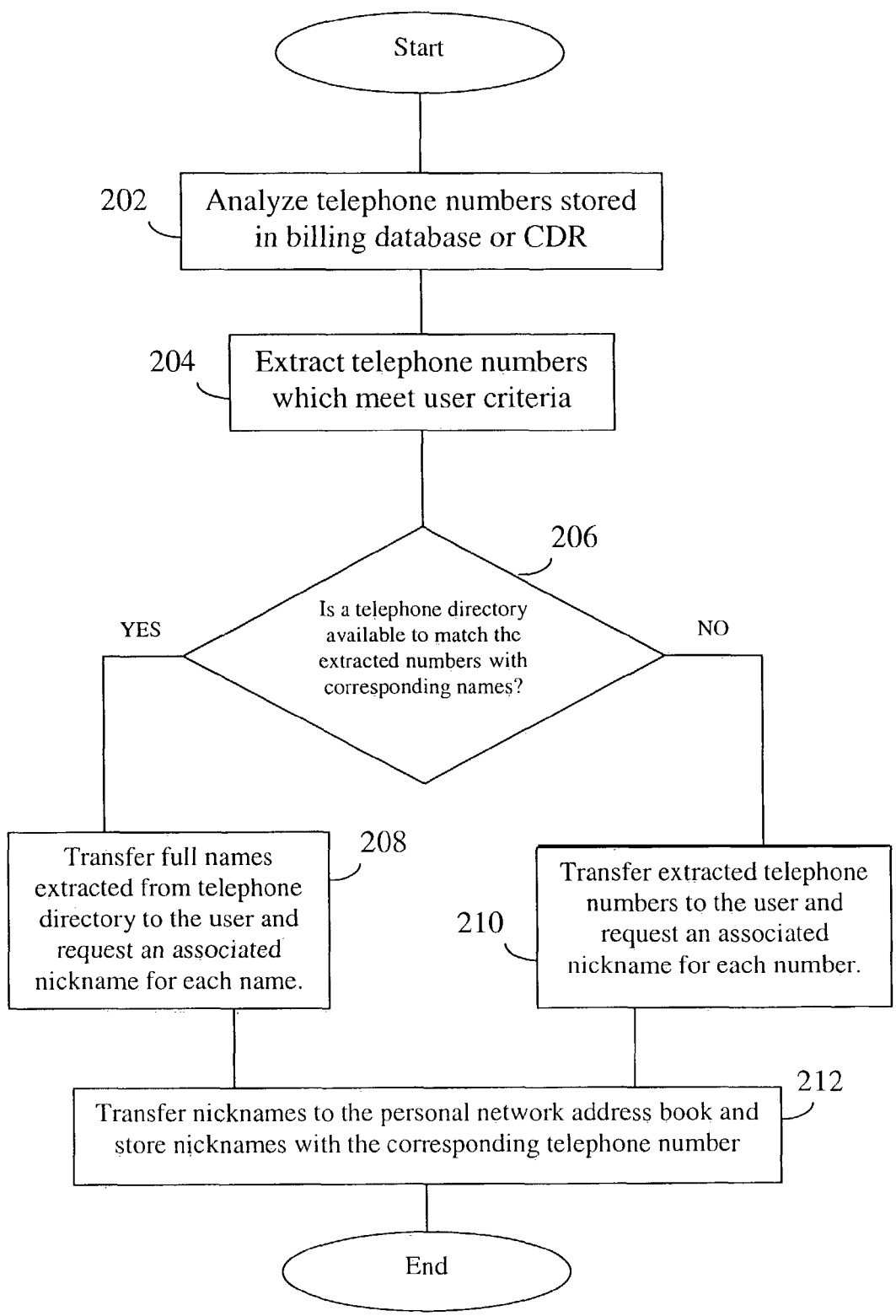
FIG. 2 is a flow chart showing a telephone based method for adding contacts to a personal network address book according to an illustrative embodiment of the present invention.

Reference is now made to FIG. 2, which depicts a flow chart illustrating the steps involved with populating a personal network address book with contact information according to an illustrative embodiment of the present invention. The process begins with a telephone call being made or received by a user of the telephone service system.

As described above with reference to FIG. 1, collector 106 gathers data from switch 104 and builds a call detail record (CDR). The CDR contains the originating telephone number, the terminating telephone number, the start time of the telephone call, the end time of the telephone call, the duration of the telephone call, as well as other information. In an illustrative embodiment, the CDRs are then transferred to a CDR storage unit 110 within billing database 108.

At block 202, analyzing unit 114 analyzes the data stored in the billing database 108 by performing statistical searches at preset time periods defined by the system operator, the user, or upon demand, such as when a new user subscribes to the system. At block 204, if analyzing unit 114 determines that any of the telephone numbers meet the predetermined criteria, extracting unit 116 extracts the telephone numbers.

After the telephone numbers are extracted, aggregator 118 builds a list of the extracted telephone numbers. At block 206, it is determined whether a telephone directory 122 is available. The telephone directory 122 may either be a public telephone directory or a private telephone directory (e.g., corporate telephone directory).

If a telephone directory is available, aggregator 118 connects to telephone directory 122 via a directory connection layer. The telephone directory is searched in a reverse mode to associate a "full" or proper name and street address with each extracted telephone number. After receiving the associated "full" names and street addresses from the telephone directory, aggregator 118 sends the list of telephone numbers and associated "full" names and street addresses to transferring/requesting unit 120. The transferring/requesting unit 120, at block 208, then sends the list of "full" or proper names to the user's telephonic device 102 or computer 126 along with a request for the user to associate a nickname with each "full" or proper name.

If a telephone directory is not available, at block 210, aggregator 118 sends only the list of telephone numbers to transferring/requesting unit 120. Transferring/requesting unit 120 then transfers the list of extracted telephone numbers to the user along with a request to associate a nickname with each extracted telephone number.

The list of telephone numbers and/or full names can be sent to the user in a variety of forms. For example, the list may be sent as speech by converting the list to speech via a text to speech converter. The list may also be sent as an instant message, as an electronic mail message, a link within an electronic mail message, an SMS (Short Message Service) message, a WAP (Wireless Application Protocol) push message, or an MMS (Multimedia Messaging Services) message. Multimedia Messaging Service (MMS) allows users to exchange multimedia messages with other users. MMS supports the transmission of text, pictures, audio, video, and any combination thereof.

As discussed above, when the user receives the list of telephone numbers and/or full names from personal network address book 124, the user is prompted to enter a nickname for each telephone number and/or full name. The user has the option to either speak the nickname into telephonic device 102 or enter the nickname in textual form to telephonic device 102 or computer 126.

After the user inputs the nickname, the nickname is transferred back to the transferring/requesting unit 120. After receiving the nickname, transferring/requesting unit 120, at block 212, transfers the telephone number and associated nickname, as well as the full name and street address (if available), to the personal network address book 124. With at least the telephone number and associated nickname stored in the personal network address book 124, the user is now able to utilize the nickname for voice activated dialing of the associated telephone number.

Additionally, the user may be prompted to match other attributes to each telephone number and/or full name. For example, the user may be requested to supply an e-mail address, home address, business address, company name, and other attributes that are commonly stored in address books. The other attributes may be transferred to transferring/requesting unit 120 and stored in personal network address book 124 along with the nickname and corresponding telephone number.

A nickname is considered to be any name that the user desires to associate with a particular telephone number. In an illustrative embodiment, the nickname is a name other than the "full" or proper name that would be listed in a telephone directory, but is not limited as such. By utilizing nicknames, as opposed to "full" names, the user can personalize the way in which the address book is created and also personalize the way in which the user is able to dial a telephone number via voice activated dialing.

In an illustrative embodiment, if the user did not supply a nickname, and a "full" name was extracted from telephone directory 122, then the "full" name and telephone number are stored in the personal network address book 124. The user then has the option of overwriting the "full" name at any point in the future when the user manages the personal network address book.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. For example, some or all of the features of the different embodiments discussed above may be combined into a single embodiment. Conversely, some of the features of a single embodiment discussed above may be deleted from the embodiment. Therefore, the present invention is not intended to be limited to the embodiments described herein but is to be accorded the widest scope as defined by the limitations of the claims and equivalents.

What is claimed is:

1. A method for populating an electronic address book using a computer with a processor and a memory, said method comprising:

analyzing information stored in a billing database or call data record, wherein said analyzing is a statistical search;

extracting at least one telephone number from the billing database or the call data record if at least some of the information stored in the billing database or call detail record meets predetermined criteria, wherein the predetermined criteria comprises a number of times the user receives a call from the at least one telephone number within a certain time period;

adding the extracted at least one telephone number to the electronic address book; and deleting from the address book telephone numbers that are stale numbers.

2. The method according to claim 1, further comprising transferring data to a user, wherein the data transferred to the user relates to the at least one extracted telephone number.

3. The method according to claim 2, further comprising requesting information from the user, wherein the requested information relates to the data transferred to the user.

4. The method according to claim 3, wherein requesting information from the user comprises requesting the user to associate at least one nickname with the data transferred to the user.

5. The method according to claim 4, further comprising updating the electronic address book based on the information obtained from the user.

6. The method according to claim 1, wherein the address book is stored on a network server.

7. The method according to claim 1, wherein analyzing a billing database or call data record comprises analyzing telephone numbers dialed by a user.

8. The method according to claim 7, wherein analyzing a billing database or call data record further comprises analyzing originating telephone numbers for telephone calls received by the user.

9. The method according to claim 2, further comprising associating the at least one extracted telephone number with a corresponding name.

10. The method according to claim 9, wherein associating the extracted telephone number with a corresponding name comprises utilizing a telephone directory.

11. The method according to claim 10, wherein the data transferred to the user comprises a full name extracted from the telephone directory.

12. The method according to claim 2, wherein the transferred data comprises a telephone number.

13. The method according to claim 2, wherein the data transferred to the user is transferred in the form of synthesized speech.

14. The method according to claim 2, wherein the data transferred to the user is transferred in the form of an electronic mail message, a link in an electronic mail message, an SMS message, an instant message, a WAP message, or an MMS message.

15. The method according to claim 1, wherein the predetermined criteria can be configured by a user of the electronic address book.

16. The method according to claim 15, wherein the predetermined criteria can be configured by an operator of the electronic address book, wherein predetermined criteria set by the user overwrites conflicting predetermined criteria set by the operator.

17. The method according to claim 1, wherein the predetermined criteria comprises a number of times a telephone number is dialed within a certain time period.

18. The method according to claim 1, wherein the predetermined criteria comprises a duration of a telephone call.

19. The method according to claim 1, wherein the stale telephone numbers are sent to a trash folder.

20. The method according to claim 19, wherein, if it is later determined that the stale numbers should be reinserted within the address book, the stale numbers are extracted from the trash folder and reinserted in the address book.

21. The method according to claim 1, wherein the predetermined criteria comprises telephone numbers that are presently stored in the address book, such that numbers stored in the address book are not extracted.

22. A system for populating an electronic address book performed by a computer with a processor and a memory comprising:

an analyzing unit which statistically analyzes information stored in a billing database or call data record;

an extracting unit which extracts at least one telephone number from the billing database or the call data record if at least some of the information stored in the billing database or call detail record meets predetermined criteria, wherein the predetermined criteria comprises a number of times the user receives a call from the at least one telephone number within a certain time period; and a transferring unit which adds the extracted at least one telephone number to the electronic address book, wherein the analyzing unit deletes from the address book telephone numbers that are stale numbers.

23. The system according to claim 22, further comprising a transferring unit which transfers data to a user, wherein the data transferred to the user relates to the at least one extracted telephone number.

24. The system according to claim 23, further comprising a requesting unit which requests information from the user, wherein the requested information relates to the data transferred to the user.

25. The system according to claim 24, wherein the requesting unit requests the user to associate at least one nickname with the data transferred to the user.

26. The system according to claim 25, wherein the address book is updated based on the information obtained from the user.

27. The system according to claim 22, wherein the address book is stored on a network server.

28. The system according to claim 22, wherein the analyzing unit analyzes telephone numbers dialed by a user.

29. The system according to claim 28, wherein the analyzing unit analyzes originating telephone numbers for telephone calls received by the user.

30. The system according to claim 23, wherein the at least one extracted telephone number is associated with a corresponding name by utilizing a telephone directory.

31. The system according to claim 30, wherein the data transferred to the user comprises a full name extracted from the telephone directory.

32. The system according to claim 23, wherein the transferred data comprises a telephone number.

33. The system according to claim 23, wherein the data transferred to the user is transferred in the form of synthesized speech.

34. The system according to claim 23, wherein the data transferred to the user is transferred in the form of an electronic mail message, a link in an electronic mail message, an SMS message, an instant message, a WAP message, or an MMS message.

35. The system according to claim 22, wherein the predetermined criteria is configured by a user of the electronic address book.

36. The system according to claim 35, wherein the predetermined criteria can be configured by an operator of the electronic address book, wherein predetermined criteria set by the user overwrites conflicting predetermined criteria set by the operator.

37. The system according to claim 22, wherein the predetermined criteria comprises a number of times a telephone number is dialed within a certain time period.

38. The system according to claim 22, wherein the predetermined criteria comprises a duration of a telephone call.

39. The system according to claim 22, wherein telephone numbers can be deleted from the address book based on the predetermined criteria and sent to a trash folder.

40. The system according to claim 39, wherein, if it is later determined that the deleted telephone number should be reinserted within the address book, the deleted telephone number is extracted from the trash folder and reinserted in the address book.

41. The system according to claim 22, wherein the predetermined criteria comprises telephone numbers that are presently stored in the address book, such that numbers stored in the address book are not extracted.

* * * * *